United States Patent
Koukios

(10) Patent No.: US 10,041,015 B2
(45) Date of Patent: *Aug. 7, 2018

(54) METHODOLOGY FOR THE REMOVAL OF INORGANIC COMPONENTS FROM BIOMASS OF AGRO/FOREST/URBAN ORIGIN AND FROM LOW-QUALITY COAL SUCH AS PEAT, LIGNITE, SUB-BITUMINOUS AND BITUMINOUS COALS

(76) Inventor: Emmanouil Koukios, Agia Paraskevi (GR)

( * ) Notice: Subject to any disclaimer, the term of this patent is extended or adjusted under 35 U.S.C. 154(b) by 932 days.

This patent is subject to a terminal disclaimer.

(21) Appl. No.: 13/394,137

(22) PCT Filed: Sep. 9, 2010

(86) PCT No.: PCT/EP2010/063268
§ 371 (c)(1),
(2), (4) Date: Mar. 2, 2012

(87) PCT Pub. No.: WO2011/029891
PCT Pub. Date: Mar. 17, 2011

(65) Prior Publication Data
US 2012/0151835 A1 Jun. 21, 2012

(30) Foreign Application Priority Data

Sep. 10, 2009 (GR) .............................. 20090100486
Sep. 10, 2009 (GR) .............................. 20090100487
Jan. 11, 2010 (GR) .............................. 20100100012

(51) Int. Cl.
| | | |
|---|---|---|
| *C10L 5/00* | (2006.01) |
| *C10L 5/48* | (2006.01) |
| *C10B 53/00* | (2006.01) |
| *C10B 57/14* | (2006.01) |
| *C10G 1/00* | (2006.01) |
| *C10G 1/02* | (2006.01) |
| *C10L 5/46* | (2006.01) |
| *C10L 9/08* | (2006.01) |
| *C10L 9/10* | (2006.01) |

(52) U.S. Cl.
CPC ............... *C10L 5/48* (2013.01); *C10B 53/00* (2013.01); *C10B 57/14* (2013.01); *C10G 1/00* (2013.01); *C10G 1/02* (2013.01); *C10L 5/46* (2013.01); *C10L 9/08* (2013.01); *C10L 9/083* (2013.01); *C10L 9/10* (2013.01); *C10G 2300/1003* (2013.01); *C10G 2300/201* (2013.01); *Y02E 50/10* (2013.01); *Y02E 50/14* (2013.01); *Y02E 50/15* (2013.01); *Y02E 50/30* (2013.01)

(58) Field of Classification Search
CPC . C10G 1/02; C10G 1/00; C10G 1/047; C10G 2300/1003; C10G 2300/201; C10G 2300/1011; C10L 9/083; C10L 9/02; C10L 9/08; C10L 9/10; C10L 5/44; C10L 5/46; C10L 5/48; Y02E 50/10; Y02E 50/14; Y02E 50/15; Y02E 50/30
USPC .......................................... 44/500, 505, 605
See application file for complete search history.

(56) References Cited

U.S. PATENT DOCUMENTS

| | | | | | |
|---|---|---|---|---|---|
| 4,560,390 A | * | 12/1985 | Bender | ..................... | C10L 9/02 209/172 |
| 5,264,623 A | * | 11/1993 | Oehr et al. | ..................... | 562/515 |

(Continued)

FOREIGN PATENT DOCUMENTS

WO   WO 2009003920 A1 * 1/2009 ............. C10B 53/02

OTHER PUBLICATIONS

Haglund et al. "The Acidic Groups in Wood and Pulp as MEasured by Ion Exchange". Journal of Polymer Science: Part C. 1965. No. 11. pp. 221-241.*

*Primary Examiner* — Latosha Hines
(74) *Attorney, Agent, or Firm* — Soula Skokos; Skokos Law Group LLC

(57) ABSTRACT

A methodology for the removal of the harmful components of the ash of biomass of agro/forest/urban origin and of low-quality coal fuels, as peat, lignite, sub-bituminous and bituminous coals, is invented. The harmful components are alkaline metals, chlorine and sulphur. They are removed before the thermochemical conversion in order to prevent or minimise the corrosion, scaling/deposition, ash agglomeration problems, as well as the alkaline metal, chlorine, sulphur emissions. Furthermore, it aims in the production of materials of low moisture content, low hygroscopicity, which can be easily ground, and mixed with various other materials, easily fed to commercial boilers for energy production, which can be easily pelletised with or without other materials at various proportions and with very low energy requirements. The removal is achieved with pre-pyrolysis/pre-gasification at 250-320° C. for 5 min to 2 h of biomass of agro/forest/urban origin, as well as, of low-quality coal fuels, as peat, lignite, sub-bituminous and bituminous coals. Then the pre-pyrolysed/pre-gasified sample is washed with a 0.5%-20% weight basis aqueous calcium acetate and/or magnesium acetate and/or aluminum acetate and/or ammonium acetate solution. These acetate salts can be mixed in a proportion of 0% to 100% to form an active salt which is used for the preparation of the aqueous solution. Any kind tap water from a public water supply system, spring, etc. can be used for the preparation of aqueous solution. The solid-to-liquid ratio is 33 g/L to 600 g/L, the temperature varies from 13° C. to 95° C., and the treatment duration between 5 min to 24 h.

14 Claims, No Drawings

(56) References Cited

U.S. PATENT DOCUMENTS 6,202,577 B1 * 3/2001 Boguslaysky et al. ....... 110/346
2009/0272027 A1 * 11/2009 Ruiters .......................... 44/505

* cited by examiner

METHODOLOGY FOR THE REMOVAL OF INORGANIC COMPONENTS FROM BIOMASS OF AGRO/FOREST/URBAN ORIGIN AND FROM LOW-QUALITY COAL SUCH AS PEAT, LIGNITE, SUB-BITUMINOUS AND BITUMINOUS COALS

The present invention refers to a methodology of removal of inorganic components such as potassium, sodium, chlorine, sulphur from biomass of agro/forest/urban origin and from low-quality coal fuels, such as peat, lignite and sub-bituminous and bituminous coals. This methodology can minimize/diminish corrosion and deposition/scaling problems, ash agglomeration, and gas emissions (potassium, sodium, chlorine and sulphur), during thermochemical ashing, incineration, gasification, pyrolysis, of the specific biomass material of agro/forest and urban origin and of low quality coal fuels as peat, lignite and sub-bituminous and bituminous coals with great economic and environmental benefits.

The main cause of the problems which arise during the thermochemical ashing, incineration, gasification, and pyrolysis, which are mainly applied in large scale energy and/or heat production, is the composition of the ash generated by the feedstock. The feedstock in our case is either biomass of agro/forest and urban origin, as the diverse straw types, agro-industrial residues, such as the ones produced from cotton, olive, peanut processing industries, as well as trimmings and wood residues from construction and furniture production, or low-quality coal fuels, as peat, lignite and sub-bituminous and bituminous coals. The ash of the specific biomass types is very rich in metal alkalis, chlorine and sulphur, therefore, the gases, liquids, and solids produced during the thermochemical conversion tend to react with each other or with any other inorganic material present, as well as with metal surfaces of the reactors, causing corrosion, deposition/scaling, agglomeration and gas emissions. These phenomena are responsible for financial losses, environmental problems, as well as for the inability of the use of the specific biomass types in large scale, either alone or in combination with solid, liquid and gas fuels for energy, liquid fuel and chemical production. Similarly, the ash of several low quality coal fuels, as peat, lignite and sub-bituminous and bituminous coals, is also rich in metal alkalis, chlorine and sulphur, where the ash composition differs depending on the coal quality and the specific characteristics of each coal deposit. Consequently, similar problems, although of lower intensity in comparison with biomass use, are observed, which lead to the financial losses, environmental problems, and limited efficiency in the use of such coals, as well as to problems in their application when, as in the case of the gasification of lignite with high sodium and chloride content for energy and/or liquid fuel production.

When these problems are solved, biomass will be largely used in energy generation, liquid fuel and chemical production. Furthermore, the use of coal will be financially and technically more efficient, with large economic and environmental benefits, particularly nowadays, when the imported energy cost is rising, and greenhouse gases from solid fuels should be reduced. The widespread use of biomass and the more efficient use of low-quality coals, which are applied in energy generation, are expected to contribute decisively not only in the reduction of greenhouse gases, but also in the cost reduction of energy and fuel production.

The currently applied techniques and methods in dealing with these problems have only limited success and, as a consequence, the use of biomass in thermochemical conversion appears to be, worldwide, very limited, and restricted mainly in feedstocks like wood which presents fewer problems. As far as the use of low-quality coals is concerned, the specific problems limit their thermochemical conversion efficiency and lead in the use of larger amounts of feedstocks for the production of energy and fuels/chemicals, causing the increase in greenhouse gas emissions and the financially non-efficient exploitation of the coal deposits with larger content of alkaline metals, chlorine and sulphur.

The object of this invention is to remove the harmful components from the ash of biomass of agro/forest/urban origin and of low-quality coal fuels, as peat, lignite, sub-bituminous and bituminous coals. These components are alkaline metals, chlorine and sulphur. The harmful components are removed before thermochemical conversion, preventing or minimizing the corrosion, scaling/deposition, ash agglomeration problems, and alkaline metal, chlorine and sulphur emissions. Another object of the invention is the production of material of low moisture content, of low hygroscopicity, which will be easily grindable, easily mixable with various other materials, easily fed in commercial boilers and easily pelletised at low energy consumption.

The object is achieved with a method for the removal of the harmful components of the biomass of agro/forest/urban origin and of low-quality coal fuels, as peat, lignite and sub-bituminous and bituminous coals, before the thermochemical conversion. The method has the following steps: i) pre-pyrolysis/pre-gasification of biomass and low-quality coal fuels, ii) washing of pre-pyrolyzed/pre-gasified raw materials with aqueous solution of acetate salts.

Optional features that present further advantages when combined with the features of the independent claim 1 are included in the dependent claims.

The hydrothermal treatment of various biomass types of agro/forest/urban origin, as well as of low-quality coal fuels, as peat, lignite sub-bituminous and bituminous coals is achieved through the combined use of this 2-step process.

Examples for the implementation of the invention are presented below:

First, the specific biomass types of agro/forest/urban origin, as well as, low-quality coal fuels, as peat, lignite, sub-bituminous and bituminous coals, are heated anaerobicallly and/or with a small amount of oxygen. This amount is less than the 30% of that one required for stoichiometrical oxidation/combustion of these materials at temperatures from 200° C. to 300° C. The best and economically the most attractive results are achieved between 250° C. and 300° C. The treatment time is from 5 min to 2 h, while the best and the most cost effective results are achieved between 10 and 40 min. This treatment is called pre-pyrolysis, and in case that air is used low-temperature pre-gasification. During this treatment the organic structure of various biomass types of agro/forest/urban origin, as well as, of low-quality coal fuels, as peat, lignite, sub-bituminous and bituminous coals breaks and a material with higher fixed carbon and less volatile matter content is produced, whereas, a small amount of gases are also produced, mainly consisted of water, carbon dioxide, carbon monoxide, as well as some light organic components which are burned in an internal combustion engine. The heat and exhaust gases produced from this engine are sued to cover the energy demand of pre-pyrolysis/pre-gasification of low temperature. By this way the pre-pyrolysis/pre-gasification becomes energetically self sufficient. Furthermore, the overall chlorine content from the organic structure of biomass of agro/forest/urban origin, as well as, low-quality coal fuels, as peat, lignite, sub-bituminous and bituminous coals, is released as hydrochloride in gas phase, which is absorbed by suitable inorganic materials like calcium and magnesium oxides, leading to non-active chloride salts, preventing its release to the environment. The various biomass types of agro/forest/urban origin and of low-quality coal fuels, as peat, lignite and sub-bituminous and bituminous coals have a mass loss of 5% to 40% dry basis, depending on the conditions and in the optimal case less than 20%. The heating value loss varies from 5% to 20% and in the optimal conditions approximately 7-10%.

Afterwards, the pre-pyrolysed/pre-gasified sample of biomass of agro/forest/urban origin, as well as, low-quality coal fuels, as peat, lignite, sub-bituminous and bituminous coals is washed with a 0.5%-20% w/w aqueous calcium acetate solution and/or magnesium acetate and/or aluminum acetate and/or ammonium acetate. These acetate salts can be mixed in a proportion of 0.001% to 100% to form an active salt which is used for the preparation of the aqueous solution.

Alternatively, they can be used separately to prepare separate solutions for successive extractions with the same results. The proportions used and the use or not of successive extractions depend on the kind and the composition of the initial material as well as on the desired properties of treated material. Any kind of tap water from a public water supply system, spring, etc. can be used for the preparation of the aqueous solutions. The liquid-to-solid ratio varies from 33 g/L to 600 g/L. The treatment temperature is from 13° C. till 95° C., and the treatment time is between 5 min and 24 h. Both liquid-to-solid ratio and treatment temperature and duration depend on the type of biomass of agro/forest/urban origin, as well as, of the low-quality coal fuels, as peat, lignite, sub-bituminous and bituminous coals. During the treatment with the aqueous solutions of calcium/magnesium/aluminium/ammonium acetates, the water soluble alkaline metals are transferred to the aqueous phase and removed from the treated material. Simultaneously, the alkaline metals, which are included in the structure of carboxyl components react with calcium/magnesium/aluminium/ammonium acetates through ion exchange reactions, and they are replaced by calcium/magnesium/aluminium/ammonium in the structure of organic material. In the meantime, calcium/magnesium/aluminium/ammonium acetates replace hydrogen atoms in the structure of carboxyl compounds, constructing carboxyl salts of calcium/magnesium and increasing in this way the concentration of calcium/magnesium/aluminium/ammonium in the ash of treated material. The consequence of this phenomenon is the increase of the ratio of the inorganic compounds, which can react as catalysts during the process of thermochemical conversion, and which possibly can increase the activity of the treated material. After washing, the material is dried in rotating dryers combining mechanical separation/dewatering and thermal drying. The produced material is free of chlorine and alkaline metals in the form of water soluble salts and salts of organic acids, these constitute the most active type of alkaline metals, which generate emission problems. The treated material also contains significantly lower sulphur (30-80% of the initial content). The calcium/magnesium/aluminium/ammonium acetates are recovered during the drying process of the treated material and recycled in the process.

The material produced after both treatments has the following characteristics: Less moisture, and hygroscopicity because of the destruction of hydrogen bonds during thermal treatment, in the case of biomass, and due to the removal of a large portion of the moisture content, which can exceed 40%, in the case of coal. Reduced grinding resistance, pulverization easiness which facilitates the mixing with other materials (carbon, biomass) are further characteristics of the treated material. Increased fixed carbon content and decreased volatile matter content, whereas the 80%-90% of the initial heating value is maintained. Free of chlorine and alkaline metals. Substantial decrease of sulphur content 40-80% in comparison with the initial material.

As a result zero chlorine and alkaline metals are noticed and, therefore, corrosion problems, scaling/deposition, and agglomeration because of chlorine, alkaline metals are avoided. Substantially reduced or even zero sulphur emissions, and consequent reduction of the gas phase pollutants, as well as of the corrosion, scaling/deposition, agglomeration caused by the sulphur contained in the ash of biomass of agro/forest/urban origin, as well as, in the ash of low-quality coal fuels, as peat, lignite, sub-bituminous and bituminous coals, are achieved. The results from the lab scale experiments showed that chlorine and alkaline metal emissions are always zero no matter what the treated materials are. Sulphur can be zero or significantly reduced compared to the initial untreated material depending on the types of the under treatment agro/forest/urban biomass and of the low-quality coal and on the composition of their ash.

The following examples aim at showing the effect of the invention on two very important material groups:

1. Biomass of agro/forest/urban origin
2. Low-quality coal fuels (peat, lignite, sub-bituminous and bituminous coals)

EXAMPLE 1

Olive kernel wood from olive kernel oil production plant in Messinia (GR), is pre-pyrolysed at 300° C. for 1 h. Subsequently, washing is applied, with an aqueous calcium acetate solution, 10% (w/w), for 1 h at a solid to liquid ratio 300 g/L, under constant stirring and heating, at 70° C., in a 2 L beaker on a hotplate. Following the pretreatment the sample is filtered and dried at 50° C. Table 1 shows the composition of olive kernel wood before and after the pretreatment, whereas, Table 2 presents the composition of the ash content before and after the pretreatment. Ash analysis showed that the pretreated material does not contain chlorine and alkaline metals at all, the calcium concentration is increased, while the concentration of sulphur is considerably reduced, compared to the initial material.

EXAMPLE 2

Lignite from North Dakota (US), which has high sodium and chloride concentration, is pre-pyrolysed at 300° C. for 1 h. Subsequently, washing is applied, with an aqueous calcium acetate solution, 10% (w/w), for 1 h at a solid to liquid ratio 350 g/L, under constant stirring and heating, at 70° C., in a 2 L beaker on a hotplate. Following the pretreatment the sample is filtered and dried at 50° C. Table 1 shows the composition of olive kernel wood before and after the pretreatment, whereas, Table 2 presents the composition of the ash content before and after the pretreatment. Ash analysis showed that the pretreated lignite does not contain chlorine and alkaline metals at all, the calcium concentration is increased, while the concentration of sulphur is considerably reduced, compared to the initial material.

TABLE 1

Analysis and characterization of olive kernel wood and lignite

|  | Raw olive kernel wood (not pretreated) | Pretreated olive kernel wood | Raw lignite (non pretreated) | Pretreated lignite |
|---|---|---|---|---|
| Proximate Analysis (% d.b.) | | | | |
| Moisture | 9.5 | 2.56 | 21.3 | 5.15 |
| Ash | 4.60 | 5.58 | 12.25 | 10.01 |
| Volatile matter | 76.0 | 29.25 | 41.77 | 39.96 |
| Fixed Carbon | 19.40 | 62.68 | 45.98 | 50.03 |
| Elemental analysis (% d/b.) | | | | |
| Carbon | 50.7 | 72.98 | 56.34 | 60.7 |
| Hydrogen | 5.89 | 3.51 | 4.46 | 3.58 |
| Nitrogen | 1.36 | 1.79 | 1.24 | 1.02 |
| Sulphur | 0.3 | 0.07 | 1.31 | 0.73 |
| Chloride | 0.18 | <0.01 | 0.2 | <0.01 |
| Oxygen | 36.97 | 13.59 | 24.2 | 22.89 |
| Heating value | 21.21 | 28.2 | 23.68 | 24.34 |

TABLE 2

Analysis and characterization of ash from olive kernel wood and lignite

| Analysis (%) | Raw olive kernel wood (not pretreated) | Pretreated olive kernel wood | Raw lignite (non pretreated) | Pretreated lignite |
|---|---|---|---|---|
| $SiO_2$ | 32.6 | 45.38 | 18.8 | 29.2 |
| MgO | 3.79 | 5.9 | 6.14 | 9.6 |
| $Al_2O_3$ | 2.96 | 4.3 | 6.9 | 12.1 |
| CaO | 10.22 | 29.8 | 18.3 | 23.4 |
| $Fe_2O_3$ | 1.9 | 1.35 | 15.16 | 9.1 |
| $TiO_2$ | 0.1 | 0.15 | 0.29 | 0.37 |
| $P_2O_5$ | 9.5 | 8.1 | 0.3 | 0.14 |
| $K_2O$ | 27.23 | 0.05 | 0.72 | 0.3 |
| $Na_2O$ | 4.17 | 0.01 | 10.15 | 0.05 |
| $SO_3$ | 4.97 | 2.48 | 21.61 | 15.93 |
| Cl | 1.43 | <0.01 | 1.6 | <0.01 |

The described methodology achieves the removal of the harmful components of the ash of biomass of agro/forest/urban origin and of low-quality coal fuels, as peat, lignite, sub-bituminous and bituminous coals. The harmful components are alkaline metals, chlorine and sulphur. They are removed before the thermochemical conversion in order to prevent or minimise the corrosion, scaling/deposition, ash agglomeration problems, as well as the alkaline metal, chlorine, sulphur emissions. Furthermore, it aims in the production of materials of low moisture content, low hygroscopicity, which can be easily ground, and mixed with various other materials, easily fed to commercial boilers for energy production, which can be easily pelletised with or without other materials at various proportions and with very low energy requirements.

In the application of the method, various types of biomass of agro/forest/urban origin and of low-quality coal fuels, as peat, lignite, sub-bituminous and bituminous coals are at pre-pyrolysed/pre-gasified 250-300° C. for 5 min up to 2 h and then, the pre-pyrolysed/pre-gasified sample is washed with a 0.5%-20% weight basis aqueous calcium acetate and/or magnesium acetate and/or aluminum acetate and/or ammonium acetate solution. These acetate salts can be mixed in a proportion of 0% to 100% to form an active salt which is used for the preparation of the aqueous solution. Alternatively, they can be used separately to prepare separate solutions for successive extractions with the same results. The proportions used and the use or not of successive extractions depend on the kind and on the composition of the initial material as well as on the desired properties of the material after treatment. Any kind tap water from a public water supply system, spring, etc. can be used for the preparation of aqueous solution. The solid-to-liquid ratio is 33 g/L to 600 g/L, the temperature varies from 13° C. to 95° C., and the treatment duration between 5 min to 24 h. The solid/liquid ratio, as well as, the temperature and the duration of the process depends on the type of the treated material. Following the washing of the material it is dried in rotating dryers combining mechanical separation and drying. The produced material is free of chlorine and alkaline metals in the form of water soluble salts and salts of organic acids, these constitute the most active type of alkaline metals, which generate emission problems. The treated material also contains significantly lower sulphur (30-80% of the initial content). The calcium/magnesium/aluminium/ammonium acetates are recovered during the drying process of the treated material and recycled in the process.

The above described methodology can be applied in the treatment of any kind of biomass, including of the sludge from sewage plants.

I hereby claim:

1. Method for the removal of inorganic components from raw material, wherein the raw material is selected from the group consisting of biomass of agricultural/forest/industrial origin, low-quality coal fuels selected from the group consisting of lignite, peat, subbituminous, and bituminous coals that are characterized by the presence of large amounts of sulfur (higher than 0.2% in coal dry mass basis), chlorine (higher than 0.01% in coal dry mass basis), alkali metals (higher than 0.1% in coal dry mass basis) and moisture (up to 30-40% in coal wet mass basis) before thermochemical conversion of the material, and any combination thereof, wherein the raw material comprises at least a carboxylic compound containing hydrogen, the method comprises:

heating of the raw material at a temperature range between 200° C. and 300° C., for 5 min to 2 h, whereby heating is effected with a small amount of oxygen, air, and combinations thereof up to an amount that is less than 30% of that required for stoichiometrical oxidation/combustion of these materials at temperatures from 200° C. to 300° C.
and greater than 0.1%; and
washing of the heated raw material with an aqueous solution of at least one of calcium acetate salt, magnesium acetate salt, aluminum acetate salt, ammonium acetate salt, and combinations thereof at concentrations from 0.5% to 20% water weight basis, at a solid to-liquid ratio from 33 g/L up to 600 g/L, at a temperature range between 13° C. and 95° C., the treatment duration being from 5 min to 24h,
wherein the washing of the heated raw material results in_hydrogen atoms in the structure of the carboxylic compound replaced with atoms of calcium, magnesium, aluminum, ammonium, and combinations thereof in order to increase the percentage of calcium, magnesium, aluminum, and ammonium into the carboxylic compound and alter its reactivity and ash melting behavior, and
wherein, the alkaline metals which are included in the structure of carboxyl components react with calcium/magnesium/aluminum/ammonium acetates and are replaced by calcium/magnesium/aluminum/ammonium in the structure of the organic material.

2. Method according to claim 1, wherein heating is done at temperatures between 250° C. and 300° C.

3. Method according to claim 1, wherein heating is done for a period from 10 min to 40 min.

4. Method according to claim 1, wherein the acetate salts are used in separate aqueous solutions for successive extractions.

5. Method according to claim 1, wherein any kind of water from a public water system is used for the preparation of the aqueous solution.

6. Method according to claim 1, wherein after washing the raw material is dried with a combination of mechanical separation processes and of drying in rotational dryers.

7. Method according to claim 5, wherein the acetate salts are recovered during the drying process and recycled into the process.

8. Method according to claim 1, wherein the raw materials are comprised of sludges from biological waste treatments.

9. Method according to claim 1, where the reactivity of the treated material increases due to the effect caused by the increased concentration of Ca, Mg, NH4, Al ions in the structure of the treated material.

10. Method according to claim 1, where the concentration of calcium/magnesium/aluminum/ammonium increases in the ash of treated material.

11. Method according to claim 1, where the ratio of the inorganic compounds (Ca, Mg, Al, NH4), which can react as catalysts during the process of thermochemical conversion increases.

12. Method according to claim 1, wherein the calcium acetate salt, magnesium acetate salt, aluminum acetate salt, ammonium acetate salt may be used in any combination thereof.

13. Method according to claim 1, where complete elimination of reactive alkali metals and chlorine is realized after the washing of the heated raw material with an aqueous solution of at least one of calcium acetate salt, magnesium acetate salt, aluminum acetate salt, ammonium acetate salt, and combinations.

14. Method according to claim 1, where a reduction of sulfur emissions may be increased to 100%.

* * * * *